United States Patent [19]

Tkach

[11] 4,201,555
[45] May 6, 1980

[54] METHOD AND APPARATUS FOR DEGASIFICATION OF LIQUID BY INDUCED VORTEXING

[76] Inventor: Joseph Tkach, 6481 Glenwillow Dr., North Royalton, Ohio 44133

[21] Appl. No.: 914,184

[22] Filed: Jun. 12, 1978

Related U.S. Application Data

[63] Continuation of Ser. No. 755,460, Dec. 30, 1976, abandoned.

[51] Int. Cl.$^2$ .............................................. B01D 19/00
[52] U.S. Cl. .......................................... 55/20; 55/21; 55/52; 55/55; 55/160; 55/191; 55/204; 55/213; 55/217
[58] Field of Search ............... 55/52, 53, 55, 160, 55/191, 192, 201, 203–205, 210, 212, 213, 217, 456, 457, 459 R, 459 A–459 D, , 20, 21

[56] References Cited

U.S. PATENT DOCUMENTS

| | | | |
|---|---|---|---|
| 1,452,204 | 4/1923 | Luetscher | 55/210 |
| 1,734,507 | 11/1929 | Westling et al. | 55/203 |
| 1,759,947 | 5/1930 | Lee | 55/456 X |
| 2,025,196 | 12/1935 | Cornell, Jr. | 55/55 X |
| 2,450,845 | 10/1948 | Troxler et al. | 55/213 |
| 2,509,633 | 5/1950 | Flanzy | 55/55 X |
| 2,732,032 | 1/1956 | Sandison | 55/457 X |
| 2,849,930 | 9/1958 | Freeman et al. | 55/55 X |
| 3,201,919 | 8/1965 | Long | 55/191 X |
| 3,290,864 | 12/1966 | Harker et al. | 55/203 |
| 3,397,512 | 8/1968 | Webb | 55/204 |
| 3,535,854 | 10/1970 | Taylor | 55/457 X |

*Primary Examiner*—Robert H. Spitzer
*Attorney, Agent, or Firm*—Watts, Hoffmann, Fisher & Heinke Co.

[57] ABSTRACT

A liquid degasification apparatus having a vortex chamber of conical configuration with fixed internal grooves arranged in a spiral pattern along with means of controlling the amount of entering liquid, the pressure within said vortex chamber, and the amounts of both the products of the degasification process and contaminated liquid to be discharged to waste. A centrifugal impeller of open design imparts a rotary motion to the liquid to create a vortex in the vortex chamber and the dynamic force to convey the degasified liquid to its ultimate point of use. An adjustable stripping means causes the products of the degasification process along with quantities of the contaminated liquid to be directed to a rotating impeller of closed design, having as its primary function, the discharge of the contaminant products to waste. The pressure within the vortex chamber is continuously controlled in relation to the temperature of the liquid and the desired degree of degasification required to support a particular process.

25 Claims, 3 Drawing Figures

METHOD AND APPARATUS FOR DEGASIFICATION OF LIQUID BY INDUCED VORTEXING

This is a continuation of application Ser. No. 755,460 filed Dec. 30, 1976, now abandoned.

BACKGROUND OF THE INVENTION

Field of the Invention—This invention relates to the degasification of liquids and the simultaneous imparting of the dynamic force to convey the liquid to its ultimate point of use. It also relates to novel methods for controlling the natural conditions attendant to the degasification of liquids and the withdrawal of the products which have contaminated the liquid so as to assure the delivery of a degasified liquid of determinable quality on a continuous basis.

Description of the Prior Art—The disadvantages of entrained and dissolved air and gases in liquids have long been recognized. Such air and gases cause corrosion of metals, vapor bind systems in which the liquids are being utilized, and in the case of liquids used as the basic medium in production processes, can effect both the quality of an end product and the reaction characteristics of the several reactants in the process. Numerous gases may also contribute to atmosheric pollution. Typical are the gases produced by the burning of fossil fuels or heating air to extremely high temperatures.

Several methods of degasification are in current use, a brief description of each follows:

(a) Counterflow Scavenging—A scavenging gas that is not in the liquid to be degasified is passed counterflow in a vertical chamber through the contaminated and downcoming liquid. Air is most commonly used as the scavenger. The dissolved gases in the liquid are rejected to the upflowing air, this by reason of the partial pressure phenomenon. An example of this type of degasification is the liberation of carbon dioxide from waters containing high bicarbonate alkalinity which have been treated with the direct application of acid or have been passed through an ion exchanger employing the principle of cation exchange on the hydrogen cycle. The carbon dioxide laden waters are introduced into the top of a vented chamber which is packed with various media to cause the break-up of the water into droplets. Forced air is introduced at the bottom of the chamber, and in rising to the vent, is infused with the carbon dioxide because the partial pressure of the gas as it exists in the liquid is greater than the pressure exerted by the minute quantities of carbon dioxide as it exists in the air. A deaerating feedwater heater is but a variation of the counterflow type degasifier. Steam replaces air as the scavenging agent and in addition to being the carrier of the rejected gases, the steam serves to unbalance saturation in favor of the vapor state of the liquid being degasified. This by elevating the temperature of the liquid. Decarbonates are also a form of counterflow degasifiers. The simplest form of which is illustrated by blowing air through a straw which has its lower end submerged in a carbonated beverage. Process decarbonating equipment involves the arrangement of a series of perforated conduit at the bottom of a vented vessel which contains the liquid to be degasified. A scavenging gas is introduced into the conduit and in rising through the liquid, unbalances the partial pressures being exerted by the several gases in the liquid. A primary deficiency of these devices, excepting the feedwater heater, is the recontamination of the liquid with the scavenging gas.

(b) Degasification by Vacuum Stripping—The method involves an apparatus similar to that used in counterflow scavenging. Contaminated liquid is introduced into the top of a closed column and passes downward over a series of slotted trays, dispersing the liquid into droplets. This action increases the surface area of the liquid to promote the release of dissolved gases upon application of sub-atmospheric pressures. External eductors create a reduced pressure which is applied at a number of openings along the vertical axis of the degasifier column. Gases liberated from the liquid are drawn from the column at these points and are ultimately discharged to the atmosphere. In such a process, the initial cost of the equipment and continued operating costs are high and the degree of degasification leaves much to be desired. In particular, it is difficult to evacuate gases from the interior areas of the column and the liquid is recontaminated in its downward progress by the gases which have been liberated at the lower levels of the column.

(c) Toricelli Method(so called because it applies to the principle developed by Toricelli in the invention of the barometer, i.e., evacuating a sealed container)—Liquid is pumped from a sealed container on a batch basis. Repeated redissolving of gases is a strong adverse factor in the Toricelli method of degasification. The gases which have been liberated by reason of sub-atomspheric pressure boiling on pump-down, redissolve in the incoming batch of contaminated liquid.

(d) Chemical Treatment—Chemical compounds have been developed to either neutralize or change the state of gases in liquids or to apply a protective film to systems materials. Chemical treatment is, in most cases, expensive and is difficult to apply in proper proportions to afford a continuous high level of protection. Where low dissolved solids concentrations in the liquid is a requirement, chemical treatment is not advisable because the additive compounds or the products of their reaction with the contaminant gases contribute substantially to the total solids in the liquid. Corrosion control compounds, particularly those in the amine, chromate, and sulfite groupings, are either toxic or deplete oxygen residuals in water. In recent years numerous pollution control authorities have enacted legislation prohibiting the indiscriminate discharge of such compounds into normal drainage facilities and natural water courses. Solids concentration control through continuous or intermittent blowdown is an example of such discharge.

Summary of the Invention

In the present invention, the contaminated liquid to be degasified is withdrawn at a relatively constant rate from a source. Typical of such source would be the sump of a cooling tower, a hot well in a steam generating plant, a device used to scrub stack gases emanating from fossil fuel burning equipment, liquid in process in a production operation, or liquid being used in a closed heating or cooling system. On start-up, the contaminated liquid is admitted into the apparatus, completely filling the vortex chamber and the housings which enclose each of the two impellers. The driver means is energized, causing the liquid to be proportionately discharged to both the system and to waste. As succeeding liquid is induced to enter the apparatus, a vortex is established. This by virtue of limiting the volume of entering liquid to an amount is slightly less than the volumetric capacity of the apparatus. In operation, the pressure is at a maximum value at the interface of the liquid and the vortex chamber and at a minimum or near zero value at the interface of the liquid and the vortex. At this latter point of interface, the liquid vaporizes into the vortex. In this invention, the vapor zone is given precise definition by reason of the volumetric characteristics imposed by the configuration of the vortex chamber.

The pressure within the vapor zone of the vortex tends to approach an absolute zero value. The pressure condition is immediately reflected in the unbalancing of the saturation equilibrium of the liquid and its vapor, stated more simply, boiling. The release of gases from the liquid occurs in three separate actions. The first two actions are nearly simultaneous and involve the liberation of entrained gases as the liquid is exposed to the reduced pressure, followed by the release of dissolved gases as saturation is unbalanced in favor of the vapor state of the liquid. This latter release due to the solubility of gases in liquid being zero at the boiling point. The imbalance at the boiling point contributes to the dissociation of gas oriented compounds which are in loose chemical union with the liquid. Typical of these compounds are carbon dioxide, ammonia, hydrogen sulfide, and the oxides of nitrogen and sulfur. To assure the exposure of the entire amount of the liquid to the reduced pressure of the vortex, a series of spiral grooves are affixed or cast into the interior surface of the vortex chamber. The friction forces at the interface of the liquid and the grooves impart a secondary rotary motion to the liquid causing it to be exposed repeatedly to the reduced pressure which exists at the interface of the liquid and vapor zones in the vortex.

The present invention provides means for scavenging the gases from the vapor zone. A skimmer device intercepts gases, vapors, and the contaminated boundary layer at the interface of the liquid and vapor zones. The skimmer means is of conical configuration and is mounted in such manner as to have its apex at an opposite end to the apex of the vortex chamber. Both the skimmer and the vortex chamber share common alignment with regard to the longitudinal axis of the apparatus. The movement of the skimmer means is either convergent or divergent with respect to the vortex. External control of the skimmer is provided by means hereinafter described. Gases, vapors, and the contaminated boundary layer of liquid are directed to the skimmer means by the dynamic force of the liquid as it moves toward the primary impeller, aided by the reduced pressure created by the action of the second impeller.

Means are provided in this invention for imparting the dynamic force required to convey the degasified liquid to its ultimate point of use and the products of the degasification process to waste. In the first instance, the force is imparted by a centrifugal impeller of open design, a design which is common to many end suction pumps. The products of degasification are discharged to waste by an end suction impeller of closed design. An integral and tubular extension of the closed impeller face provides both a driver for the primary impeller and a passageway for the waste products to enter the vanes of the closed impeller. Alternate means for the evacuation of the waste products are depicted on FIGS. 2A and 2B.

Unique means are provided in this invention for the control of the degasification process and the scavenging of the waste products from the vortex chamber. Pressure within the vapor zone of the vortex is of primary importance in the release of entrained and dissolved gases and the dissociation of those gases which are held in loose chemical union with the liquid. This because pressure relates directly to the unbalancing of saturation with respect to temperature. A throttling valve is placed at the contaminated liquid inlet, having as its primary function the limiting of inflow so that the combined volumetric capacity of the two impellers narrowly exceeds the quantity of incoming liquid. Where the temperature of the incoming liquid is constant, a pressure sensing element is located in the vapor zone, communicating through a sensor-transmitter with the throttling valve actuator. The control train is calibrated in a manner to provide a leading pressure so that its magnitude is less than that required to maintain a continuous imbalance of saturation in favor of the vapor state of the liquid. In the case of temperature variations in the incoming liquid, a sensing element is placed in the inlet conduit and acting through a control train, the leading pressure condition is maintained in the vapor zone. The throttling valve includes still another feature which imparts rapid, intermittent, and minute pulsations to the incoming liquid, creating a sine wave turbulence at the interface of the liquid and vapor zone within the vortex. The turbulence serves to entrain gases and vapors to the skimmer means and further prevents a balanced condition of saturation to develop within the vortex. Means for the constant monitoring of the quality of the degasified liquid is provided in this invention. A sensor or collector means is located in the degasified liquid outlet conduit communicating with an analyzer-transmitter and sequentially to the skimmer actuator. The conditions being monitored may include, among others, dissolved gases or pH, pH as it relates to concentrations of carbon dioxide, ammonia, hydrogen sulfide, or the oxides of nitrogen and sulfur. Departures in liquid quality from a predetermined norm will cause the skimmer means to be positioned so that the required amount of the interface boundary layer of liquid will be diverted to waste.

In the present invention, degasification is provided over all ranges of flow, from a minimum to the maximum volumetric capacity of the apparatus. In a conventional centrifugal pump, the vortex formation occurs as the pump reaches its maximum capacity while the suction tends to be flooded at the reduced load condition. Where temperature is used as the basis of control in this invention, communication is provided between the pressure sensor and the sensor-transmitter in the throttling valve actuator control train. The sensor-transmitter is calibrated in such manner as to prevent the pressure within the vortex zone from rising above a predetermined value. This by controlling the amount of entering liquid. The predetermined value is defined as that pressure which will assure the existence of a vapor or void condition within the vortex chamber.

Accordingly, it is an object of this invention to provide improved method and apparatus for continuously inducing a saturation imbalance in favor of the vapor state of a liquid. Other objects, features, and advantages of this invention will become apparent from the following detailed description, when considered in conjunction with the accompanying drawings, in which FIG. 1, diagrammatically shows in side elevation and in part broken away, a degasification apparatus of preferred construction, while FIGS. 2A and 2B show possible alternates to waste evacuation means.

DESCRIPTION OF PREFERRED EMBODIMENT

Figure 1:
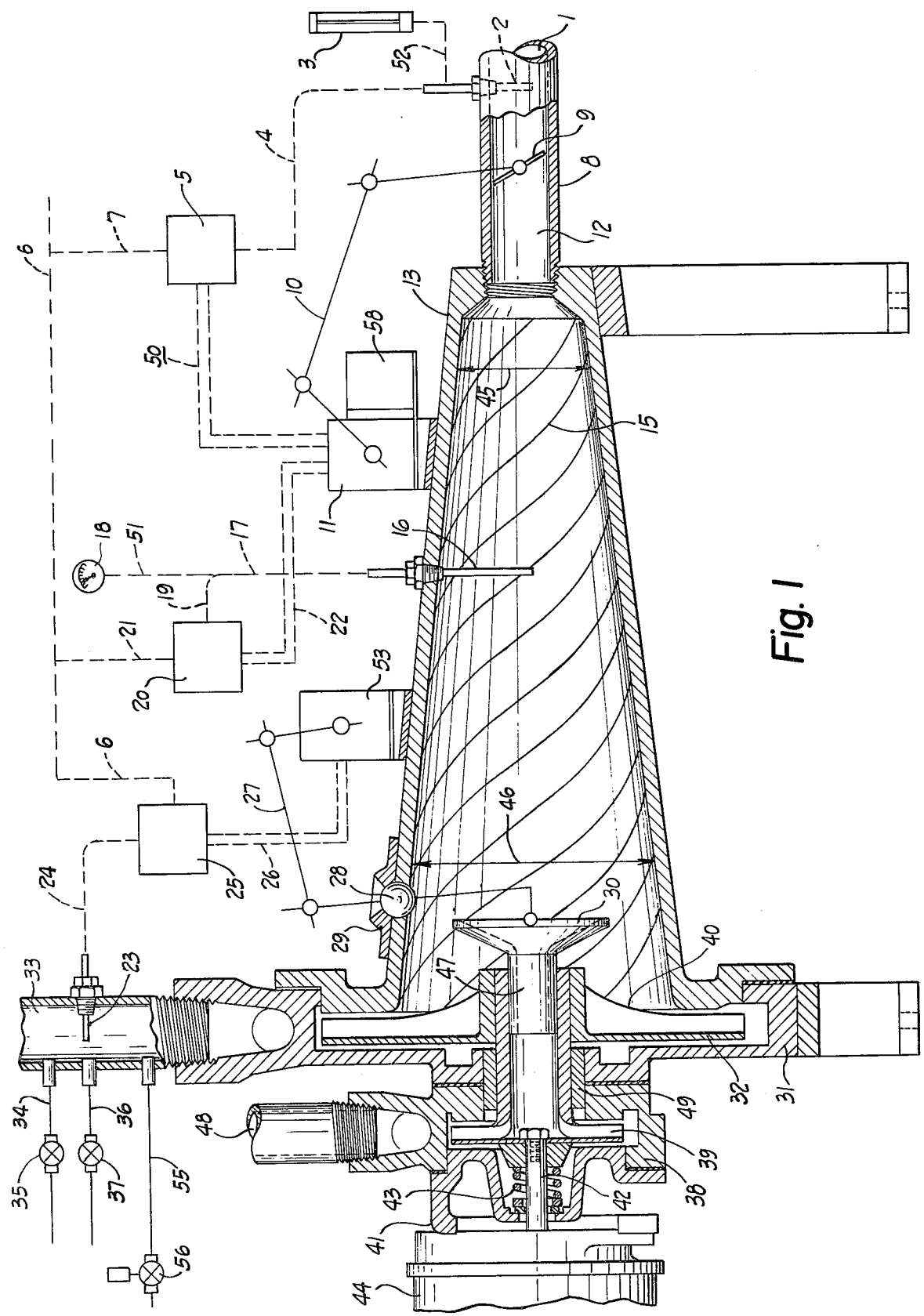

Referring now to FIG. 1, a main pipe or conduit 1 is shown for conveying the liquid to be degasified. Typically, the pipe or conduit 1 can be connected to the sump of a cooling tower, a hot well in a steam generating plant, a device used to scrub the gases emanating from fossil fuel burning equipment, a production process which is liquid oriented, or a closed heating or cooling system. A throttling valve assembly 8 is located immediately ahead of the degasification apparatus and has an adjustable vane 9 which controls the flow of contaminated liquid to the apparatus. The throttling valve assembly 8 shown is of the butterfly type, however, it may be one of a variety of valves normally used in flow regulation service. Conduit 12 is a continuation of inlet conduit 1, directing contaminated liquid flow to the main body of the apparatus.

Vortex chamber 13 is of conical configuration for the express purpose of giving definition to the vapor or void zone within the vortex chamber. A vapor zone is developed within vortex chamber 13 by the action of open impeller 32 imparting an acceleration to the liquid such that the velocity of the rotating liquid creates a pressure of maximum value at the interface of the liquid and vortex chamber 13 and a minimum or near zero pressure at the interface of the liquid and the vapor zone. Spiral grooves 15 serve the primary purpose of creating a secondary rotation in the liquid by providing the friction at the interface of the liquid and the grooves. The secondary rotation assures the repeated exposure of the liquid to the reduced pressure of the vapor or void zone.

Several means are provided to control the pressure within the vapor zone of vortex chamber 13. Where the temperature of the contaminated liquid is subject to variation, a temperature sensing element 2 is installed in the inlet conduit 1 communicating with sensor-transmitter 5 through circuit 4. The sensor-transmitter 5 proportions the actuating medium which is supplied through circuit 6 and more directly through circuit 7 and thence to actuator 11 through circuit 50. The actuating medium may be either pneumatic, hydraulic, or electric. As a need for a pressure variation develops in the vapor zone with respect to a change in the temperature of the incoming liquid, actuator 11 repositions adjustable vane 9 in throttling valve assembly 8 through linkage 10. Thus an imbalance of saturation conditions within the vapor zone may be continuously maintained.

Where the temperature of the incoming liquid is substantially constant, only the pressure within the vapor zone of vortex chamber 13 need be monitored. Pressure sensing element 16 is extended into the vapor zone, communicating with senor-transmitter 20 through circuit 17 and its branch 19. As the need for a pressure variation arises, the actuating medium is transmitted through circuit 21 to pressure sensor-transmitter 20, thence through circuit 22 to actuator means 11, thence to adjustable vane 9 through linkage 10. In either of the foregoing cases of controlling the pressure within the vapor zone, temperature sensing element 2 and pressure sensing element 16 are required as calibrating means for the control system. Compound pressure-vacuum gage 18 communicating with sensing element 16 through circuit 51 and thermometer 3 communicating with temperature element 2 through circuit 52 provide visual reference for calibration purposes. Actuator 11 is equipped with pulsator 58 which imparts rapid, intermittent, and minute motion to linkage 10 so as to cause the partial opening and closing of adjustable vane 9 in valve assembly 8. This in addition to the normal compensatory movement of adjustable vane 9 in response to the sensing of variations of temperature or pressure as hereinbefore described.

The vapor zone in vortex chamber 13 is developed by limiting the quantity of incoming liquid so that the volumetric capacity of the apparatus narrowly exceeds the inflow. An exaggerated definition of the vapor zone is provided by the conical configuration of vortex chamber 13 as evidenced by dimension 45 at the inlet and increased diameter 46 at the approach to primary impeller 32. The combination of the progressive enlargement of the vortex chamber 13 and the effect of spiral grooves 15 assures the early formation and definition of the vapor zone. As the liquid approaches the downstream end of vortex chamber 13, it enters housing 31 in which primary impeller 32 is located, it is in part intercepted by skimmer 30 which in turn also intercepts the entrained and dissolved gases which have been caused to be released by the contaminated liquid. The diameter of skimmer 30 is in part predetermined by the type of service that is anticipated, i.e., the characteristics of the liquid, degree of contamination, capacity of the apparatus, and the thickness of the boundary layer of the liquid to be removed. The skimmer 30 has its apex in opposite hand to the apex of vortex chamber 13 so as to make its movement convergent or divergent to the stream of liquid entering primary impeller 32.

Liquid quality sensor element 23 is located in degasified liquid discharge conduit 33 and senses pH based on the acidity or alkalinity of the degasified liquid and communicates with sensor-transmitter 25 through circuit 24. Where it is necessary to determine the residual quantities of gas in the liquid, sensor 23 becomes a collector of the liquid which is in turn conveyed to analyzer-transmitter 25 through circuit 24. As an adverse condition in the quality of the degasified liquid develops, the actuating medium is transmitted through circuit 6 to sensor-transmitter 25 or analyzer-transmitter 25, whichever is applicable, thence communicating with actuator 53 through circuit 26 causing a compensatory positioning of skimmer 30 through linkage 27. Assembly comprised of ball 28 and socket 29 provides a seal for the entry of linkage 27 into vortex chamber 13.

Skimmer 30 has a tubular section 47 at its base to direct the flow of vapors, liberated gases, and contaminated liquid to closed impeller 39 which is contained in housing 38. The closed impeller is fitted with tubular extension 40 which functions as a driving means for open impeller 32 and serves additionally as a passageway for the waste products intercepted by skimmer 30. Closed impeller 39 discharges to waste or waste processing systems through conduit 48.

The apparatus is powered by driver 44 through shaft 42 located in driver support frame 41. A mechanical seal 43 is shown although the sealing device may be one of several types commonly used in pump construction. Bearings which are generally used in pumping apparatus are not identified save journal type bearing 49 which supports the tubular extension 40 of closed impeller 39. Conduit 34 and manually operated valve 35 provide for the venting of the apparatus on the initial fill where the source of the contaminated liquid is located above the apparatus or conduit 34 and valve 35 can be used for the introduction or priming fluid where the source of contaminated liquid is below the apparatus. Conduit 36 and manually operated valve 37 provide for the wasting of contaminated liquid being discharged by open impeller on apparatus start up. A pressure relief valve 56 communicates with degasified liquid conduit 33 through conduit 55 to assure constant flows as may be required to prevent excessive heat build-up of the liquid in the apparatus at such times as there is no demand for the degasified liquid. A continuation of conduit 55 beyond pressure relief valve 56 may either discharge to waste or to the source of the contaminated liquid.

Figure 2A:
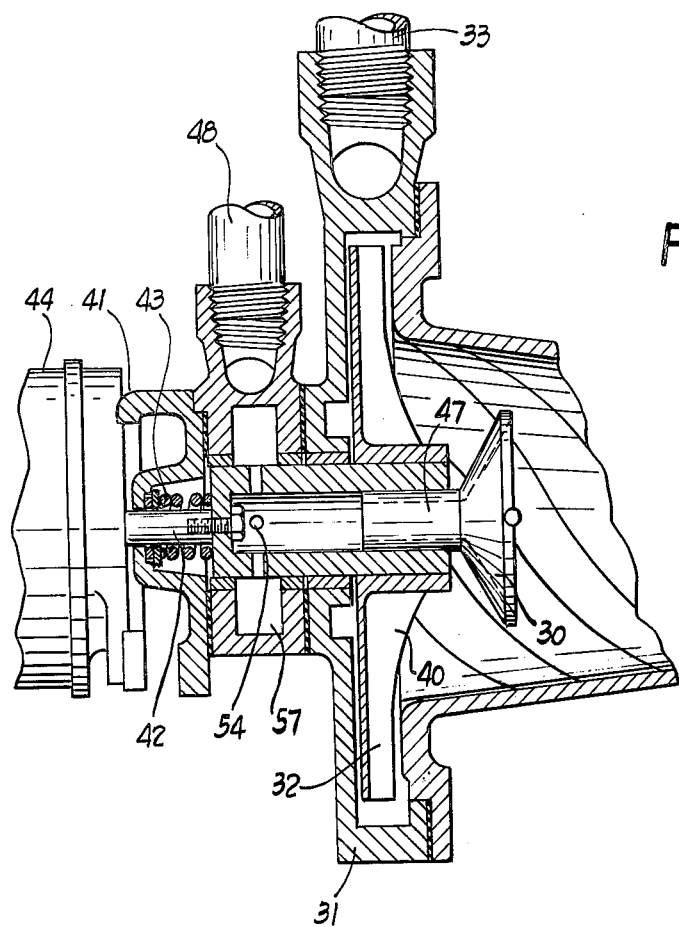
Figure 2B:
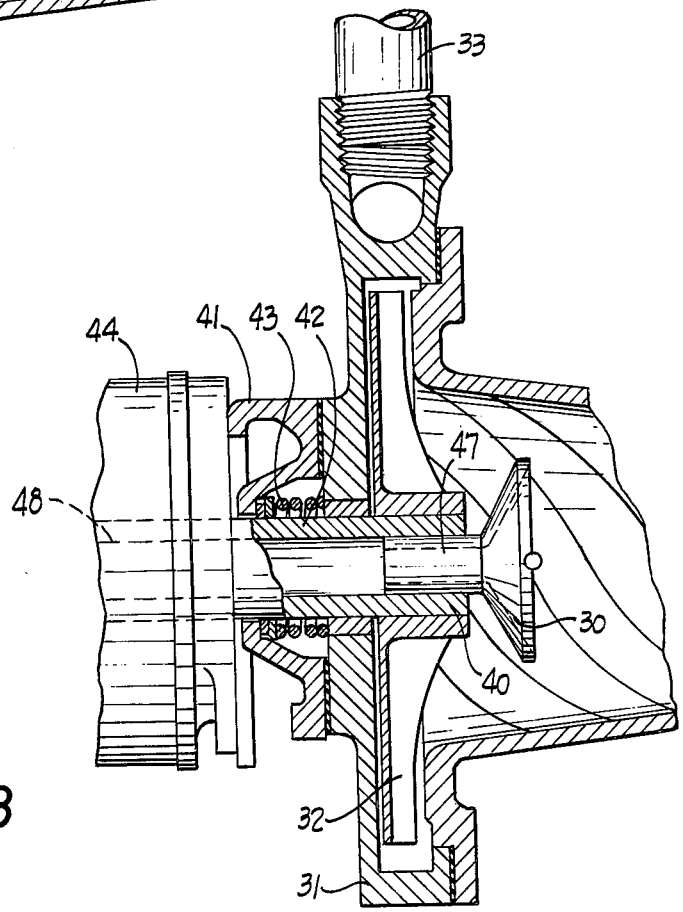

FIG. 2A shows an alternate means for evacuating waste products from the apparatus. Hole 54 is drilled in the tubular extension 40 of driver shaft 42 and is centered on annulus 57, communicating with external evacuator means, not shown. FIG. 2B shows yet another means of evacuating waste products. Tubular extension 40 is continuous through driver 44, serving both as a driver means and communicating with an external evacuator, not shown.

While in the foregoing disclosure a preferred embodiment of this invention has been described with particularity, it will be apparent that numerous modifications or alterations may be made therein without departing from the spirit and scope of the invention, as set forth in the appended claims.

What is claimed is:

1. In a method of degasifying liquid, the degasification proceeding to a desired level, by inducing an imbalance of saturation in favor of the vapor state of the liquid, the steps comprising:
   (a) defining a body of liquid to be degasified, said body being generally circular in cross sectional shape,
   (b) mechanically imparting a dynamic force to the body of liquid causing it to be transported between desired points,
   (c) applying the dynamic force by a rotary driven impeller in such manner that imparts acceleration and a rotary motion to the liquid in transport, the rotary motion and acceleration extending over the entire length of the body of liquid,
   (d) withdrawing the liquid in transport and replacing it with additional quantities of the liquid at rates that maintain a substantially constant flow of liquid to be degasified,
   (e) variably restricting the flow of replacement liquid to an extent that the total dynamic force applied to cause the transport of the liquid exceeds the force required to transport the liquid,
   (f) limiting the dynamic force so as not to overcome the inherent cohesive property of the liquid in process, and
   (g) applying the excess of the total dynamic force in a manner that creates an unoccupied space within the body of liquid in transport.

2. The method of degasifying a liquid as in claim 1 including the steps of:
   (a) maintaining the unoccupied space on a continuous basis such that a boiling action is induced at the interface of the liquid and unoccupied space, the boiling accompanied by the release of entrained and dissolved gases from the liquid in process,
   (b) giving definition to the unoccupied space such that the space assumes a conical configuration having its apex at the opposite end to the direction in which the body of liquid is being transported, and
   (c) providing a period of time, by virtue of the length of the unoccupied space within the body of liquid in process, adequate to allow liberation of the gases from the liquid.

3. The method of degasifying a liquid as in claim 2 including the step of:
   (a) exposing the total volume of the body of liquid repeatedly to the boiling action at the interface of liquid and vapor within the unoccupied space.

4. The method of degasifying liquid as in claim 2, accompanied by control measures comprising:
   (a) sensing the temperature of the body of liquid as it enters transport so that the pressure of saturation may be determined,
   (b) regulating the volumetric rate at which the body of liquid enters for transport so as to maintain a pressure within the unoccupied space that tends to be of lesser magnitude than the pressure of saturation at the entering temperature,
   (c) sensing the pressure within the unoccupied space, and
   (d) integrating the temperature and pressure data and in accordance therewith regulating the volume of liquid in process so that a pressure is established in the unoccupied space which creates an imbalance of saturation in favor of the vapor state of the liquid.

5. The method of degasifying a liquid as in claim 3 including the step of:
   (a) imparting rapid and intermittent volumetric impulses to the liquid in transport thus creating a turbulence at the interface of liquid and vapor such that the liberated gases are buffeted in the direction which the liquid is being transported.

6. The method of degasifying liquid as in claim 3, accompanied by control measures comprising:
   (a) sensing the temperature of the body of liquid as it enters transport so that the pressure of saturation may be determined,
   (b) regulating the volumetric rate at which the body of liquid enters for transport so as to maintain a pressure within the unoccupied space that tends to be of lesser magnitude than the pressure of saturation at the entering temperature,
   (c) sensing the pressure within the unoccupied space, and
   (d) integrating the temperature and pressure data and in accordance therewith regulating the volume of liquid in process so that a pressure is established in the unoccupied space which creates an imbalance of saturation in favor of the vapor state of the liquid.

7. The method of degasifying a liquid as in claim 5 including the steps of:
   (a) intercepting the vapors and gases within the unoccupied space which are moving in the direction of the body of liquid by reason of the buffeting action,
   (b) intercepting the gas contaminated boundary layer of liquid at the interface of the liquid and vapor,
   (c) combining the vapors and gases taken from the unoccupied space with the intercepted boundary layer of contaminated liquid, and
   (d) directing the vapors, gases, and contaminated boundary layer of liquid to a second source of dynamic force which causes the combined contaminants to be transported to a location remote from the remaining portion of liquid in transport.

8. The method of degasifying liquid as in claim 5, accompanied by control measures comprising:
  (a) sensing the temperature of the body of liquid as it enters transport so that the pressure of saturation may be determined,
  (b) regulating the volumetric rate at which the body of liquid enters for transport so as to maintain a pressure within the unoccupied space that tends to be of lesser magnitude than the pressure of saturation at the entering temperatue,
  (c) sensing the pressure within the unoccupied space, and
  (d) integrating the temperature and pressure data and in accordance therewith regulating the volume of liquid in process so that a pressure is established in the unoccupied space which creates an imbalance of saturation in favor of the vapor state of the liquid.

9. The method of degasifying a liquid as in claim 7 including the steps of:
  (a) directing that portion of the liquid in transport which remains after the contaminated boundary layer has been removed to the primary dynamic force for delivery to a point of degasified liquid usage, and
  (b) continuously sensing the quality of the degasified liquid being delivered for use to determine whether desired degasification is being effected.

10. The method of degasifying liquid as in claim 7, accompanied by control measures comprising:
  (a) sensing the temperature of the body of liquid as it enters transport so that the pressure of saturation may be determined,
  (b) regulating the volumetric rate at which the body of liquid enters for transport so as to maintain a pressure within the unoccupied space that tends to be of lesser magnitude than the pressure of saturation at the entering temperature,
  (c) sensing the pressure within the unoccupied space, and
  (d) integrating the temperature and pressure data and in accordance therewith regulating the volume of liquid in process so that a pressure is established in the unoccupied space which creates an imbalance of saturation in favor of the vapor state of the liquid.

11. The method of degasifying liquid as in claim 9, accompanied by control measures comprising:
  (a) sensing the temperature of the body of liquid as it enters transport so that the pressure of saturation may be determined,
  (b) regulating the volumetric rate at which the body of liquid enters for transport so as to maintain a pressure within the unoccupied space that tends to be of lesser magnitude than the pressure of saturation at the entering temperature,
  (c) sensing the pressure within the unoccupied space, and
  (d) integrating the temperature and pressure data and in accordance therewith regulating the volume of liquid in process so that a pressure is established in the unoccupied space which creates an imbalance of saturation in favor of the vapor state of the liquid.

12. The method of degasifying a liquid and applying control measures as in claim 10 including steps of:
  (a) sensing the quality of the degasified liquid being delivered for use so as to ascertain that the desired degasification is being effected,
  (b) in response thereto increasing or decreasing the amount of the boundary layer at the interface of liquid and vapor which is intercepted,
  (c) sensing the pressure in the stream formed by the combination of vapors, gases, and boundary layer of liquid to determine continuity of removal, and
  (d) in the event continuity does not exist, increasing the amount of boundary layer which is intercepted.

13. The method of degasifying a liquid and applying control measures as in claim 12 including steps of:
  (a) continuously sensing the pressure of the degasified liquid as it is being transported to the point of use to determine the existence of continuity of transport, and
  (b) in the event continuity of transport does not exist, performing at least one of the following steps: providing a volumetric increase in the body of liquid in transport, reducing the amount of boundary layer of contaminated liquid being intercepted for removal, and elevating the pressure within the unoccupied space.

14. The method of degasifying a liquid and applying control measures as in claim 10 including steps of:
  (a) continuously sensing the pressure of the degasified liquid as it is being transported to the point of use to determine the existence of continuity of transport, and
  (b) in the event continuity of transport does not exist, performing at least one of the following steps: providing a volumetric increase in the body of liquid in transport, reducing the amount of boundary layer of contaminated liquid being intercepted for removal, and elevating the pressure within the unoccupied space.

15. The method of degasifying a liquid and applying control measures as in claim 11 including steps of:
  (a) sensing the quality of the degasified liquid being delivered for use so as to ascertain that the desired degasification is being effected,
  (b) in response thereto increasing or decreasing the amount of the boundary layer at the interface of liquid and vapor which is intercepted,
  (c) sensing the pressure in the stream formed by the combination of vapors, gases, and boundary layer of liquid to determine continuity of removal, and
  (d) in the event continuity does not exist, increasing the amount of boundary layer which is intercepted.

16. The method of degasifying a liquid and applying control measures as in claim 15 including steps of:
  (a) continuously sensing the pressure of the degasified liquid as it is being transported to the point of use to determine the existence of continuity of transport, and
  (b) in the event continuity of transport does not exist, performing at least one of the following steps: providing a volumetric increase in the body of liquid in transport, reducing the amount of boundary layer of contaminated liquid being intercepted for removal, and elevating the pressure within the unoccupied space.

17. The method of degasifying a liquid and applying control measures as in claim 11 including steps of:
  (a) continuously sensing the pressure of the degasified liquid as it is being transported to the point of use to determine the existence of continuity of transport, and (b) in the event continuity of transport does not exist, performing at least one of the following steps: providing a volumetric increase in the body of liquid in transport, reducing the amount of boundary layer of contaminated liquid being intercepted for removal, and elevating the pressure within the unoccupied space.

18. The method of degasifying a liquid as in claim 1 including the steps of:
   (a) intercepting the vapors and gases within the unoccupied space which are moving in the direction of the body of liquid,
   (b) intercepting the boundary layer of liquid at the interface of the liquid and vapor,
   (c) combining the vapors and gases taken from the unoccupied space with the intercepted boundary layer of liquid, and
   (d) directing the vapors, gases and boundary layer liquid to a second source of dynamic force and removing them from the liquid in transport.

19. The method of degasifying liquid as in claim 18, accompanied by control measures comprising:
   (a) sensing the temperature of the body of liquid as it enters transport so that the pressure of saturation may be determined,
   (b) regulating the volumetric rate at which the body of liquid enters for transport so as to maintain a pressure within the unoccupied space that tends to be of lesser magnitude than the pressure of saturation at the entering temperature,
   (c) sensing the pressure within the unoccupied space, and
   (d) integrating the temperature and pressure data and in accordance therewith regulating the volume of liquid in process so that a pressure is established in the unoccupied space which creates an imbalance of saturation in favor of the vapor state of the liquid.

20. The method of degasifying a liquid and applying control measures as in claim 19 including steps of:
   (a) sensing the quality of the degasified liquid being delivered for use so as to ascertain that the desired degasification is being effected,
   (b) in response thereto increasing or decreasing the amount of the boundary layer at the interface of liquid and vapor which is intercepted,
   (c) sensing the pressure in the stream formed by the combination of vapors, gases, and boundary layer of liquid to determine continuity of removal, and
   (d) in the event continuity does not exist, increasing the amount of boundary layer which is intercepted.

21. The method of degasifying a liquid and applying control measures as in claim 20 including steps of:
   (a) continuously sensing the pressure of the degasified liquid as it is being transported to the point of use to determine the existence of continuity of transport, and
   (b) in the event continuity of transport does not exist, performing at least one of the following steps: providing a volumetric increase in the body of liquid in transport, reducing the amount of boundary layer of contaminated liquid being intercepted for removal, and elevating the pressure within the unoccupied space.

22. The method of degasifying a liquid and applying control measures as in claim 19 including steps of:
   (a) continuously sensing the pressure of the degasified liquid as it is being transported to the point of use to determine the existence of continuity of transport, and
   (b) in the event continuity of transport does not exist, performing at least one of the following steps: providing a volumetric increase in the body of liquid in transport, reducing the amount of boundary layer of contaminated liquid being intercepted for removal, and elevating the pressure within the unoccupied space.

23. The method of degasifying liquid as in claim 1, accompanied by control measures comprising:
   (a) sensing the temperature of the body of liquid as it enters transport so that the pressure of saturation may be determined,
   (b) regulating the volumetric rate at which the body of liquid enters for transport so as to maintain a pressure within the unoccupied space that tends to be of lesser magnitude than the pressure of saturation at the entering temperature,
   (c) sensing the pressure within the unoccupied space, and
   (d) integrating the temperature and pressure data and in accordance therewith regulating the volume of liquid in process so that a pressure is established in the unoccupied space which creates an imbalance of saturation in favor of the vapor state of the liquid.

24. Apparatus for degasifying liquid through an induced imbalance of saturation in favor of the vapor state of the liquid, comprising:
   (a) means including a tubular passage with an inlet end and an outlet end to define a body of liquid to be degasified,
   (b) means including an impeller to impart a dynamic force to the body of liquid sufficient to accelerate the liquid in its flow between the inlet end and the outlet end and transport it between desired points and to impart a rotary motion to the liquid in transport, while avoiding overcoming the inherent cohesive property of the liquid in process,
   (c) means to withdraw the liquid in transport,
   (d) means to replace the liquid with additional quantities at rates that maintain a substantially constant flow of liquid to be degasified, and
   (e) means variably restricting the flow of liquid to the body of liquid to an extent that the total dynamic force available from the impeller means to transport the liquid exceeds the force required for transport.

25. Apparatus as set forth in claim 24 including means adjacent said outlet end to intercept and conduct away a boundary layer of liquid from said body of liquid in transport.

* * * * *